United States Patent [19]

Parker et al.

[11] Patent Number: 5,322,343
[45] Date of Patent: Jun. 21, 1994

[54] INFANT CAR SEAT

[75] Inventors: Robert M. Parker, Aurora; Stephen B. Allard, Denver; T. Brent Freese, Westminster, all of Colo.

[73] Assignee: Gerry Baby Products Company, Denver, Colo.

[21] Appl. No.: 942,155

[22] Filed: Sep. 8, 1992

[51] Int. Cl.$^5$ .............................................. A47C 1/02
[52] U.S. Cl. ................................. 297/183; 297/184.13; 297/131; 297/270
[58] Field of Search ................ 297/183, 184.13, 130, 297/131, 270, 256.17

[56] References Cited

U.S. PATENT DOCUMENTS

| | | | |
|---|---|---|---|
| 2,981,317 | 4/1961 | Cartwright | 297/184.13 |
| 3,155,425 | 11/1964 | Chreist, Jr. | 297/131 |
| 3,804,459 | 4/1974 | Nose | 297/258 |
| 3,999,801 | 12/1976 | Walters | 297/445 |
| 4,371,206 | 2/1983 | Johnson, Jr. | 297/183 |
| 4,500,133 | 2/1985 | Nakao et al. | 297/131 |
| 4,634,175 | 1/1987 | Wise | 297/183 |
| 4,688,850 | 8/1987 | Brownlie et al. | 297/270 |
| 4,861,105 | 8/1989 | Merten et al. | 297/250 |
| 4,902,026 | 2/1990 | Maldonado | 297/184.13 |
| 4,978,166 | 12/1990 | James | 297/184.13 |
| 4,997,231 | 3/1991 | Smith | 297/183 X |
| 5,011,221 | 4/1991 | Wise | 297/191 |
| 5,143,419 | 9/1992 | Tepper et al. | 297/131 X |

*Primary Examiner*—Peter M. Cuomo
*Assistant Examiner*—Jerry Redman
*Attorney, Agent, or Firm*—Biebel & French

[57] ABSTRACT

The present invention provides an infant seat which includes a shell for receiving an infant and an arcuate handle attached to opposing sides of the shell. The handle is movable to three operative positions including a rest position wherein the handle is positioned below the shell and above a plane defined by a lower surface of the shell, a rocking position wherein the handle is positioned below the lower surface of the shell to form an arcuate rocking support surface, and a carry position wherein the handle is positioned above the shell to be used as a carry handle.

21 Claims, 6 Drawing Sheets

INFANT CAR SEAT

BACKGROUND OF THE INVENTION

The present invention relates to an infant seat and, more particularly, to a multi-function infant seat which may be used as a car seat, rocker, grocery cart seat, or infant carrier.

Various types of infant seats are known which include pivotal handle members which may be used to support the carrier in one position and to carry the infant seat in a different position. For example, U.S. Pat. No. 4,371,106 to Johnson, Jr. discloses an infant seat in which a handle may be located in a plurality of positions in order to accommodate different functions of the infant seat. The handle mechanism incorporates a gear mechanism in order to define the different handle positions.

Another example of a prior art infant seat is shown in U.S. Pat. No. 4,688,850 to Brownlee et al which discloses an infant seat having a carry handle and a separate rocker mechanism such that the infant seat may be carried as an infant carrier or the rocker mechanism may be positioned for either rocking or providing a stable support for the seat.

Prior art baby carriers generally have either required a rounded back side in order to provide a rocking function or have required the provision of an additional mechanism to provide a rocking surface for the carrier. In addition, prior art baby carriers which are intended for use as car seats in addition to being used as rockers have typically required the provision of a separate support member located along the back of the carrier and which is moved into position to prevent rocking during the car seat mode of operation. Thus, prior art infant seats are commonly found to have complex adjustment mechanisms for the handles or multiple mechanisms for providing the various modes of operation which are desired such resulting in a higher cost and complexity for the infant seats have been increased.

SUMMARY OF THE INVENTION

It is accordingly an object of the present invention to provide an infant seat wherein multiple functions are provided by the movement of a single handle element.

It is a further object of the invention to provide such an infant carrier wherein the handle may be moved to a position for providing a rocking mode of operation as well as to a position which permits stable support of the infant carrier in a car seat mode of operation.

It is yet another object of the invention to provide such an infant carrier wherein the handle may also be moved to a position for use as a carry handle.

Therefore, in one aspect of the invention, an infant seat is provided including a shell defining a cavity for receiving an infant; an arcuate handle attached to opposing sides of the shell; the handle being movable to three operative positions including: (a) a rest position wherein the handle is positioned below the shell and above a plane defined by a lower surface of the shell; (b) a rocking position wherein the handle is positioned below the lower surface of the shell to form an arcuate rocking support surface; and (c) a carry position wherein the handle is positioned above the shell to be used as a carry handle.

In another aspect of the invention, a canopy is provided supported by a canopy stay extending over the canopy and having opposing stay ends mounted to opposing sides of the shell wherein the canopy stay is mounted for pivotal movement about the stay ends to a plurality of positions.

In yet another aspect of the invention, the shell includes means defining a groove extending in a lateral direction for receiving a bar or wire rail for a grocery cart whereby the infant seat may be attached to and carried by a grocery cart.

Other objects and advantages of the invention will be apparent from the following description, the accompanying drawings, and the appended claims.

DETAILED DESCRIPTION OF THE PREFERRED EMBODIMENT

Figure 1:
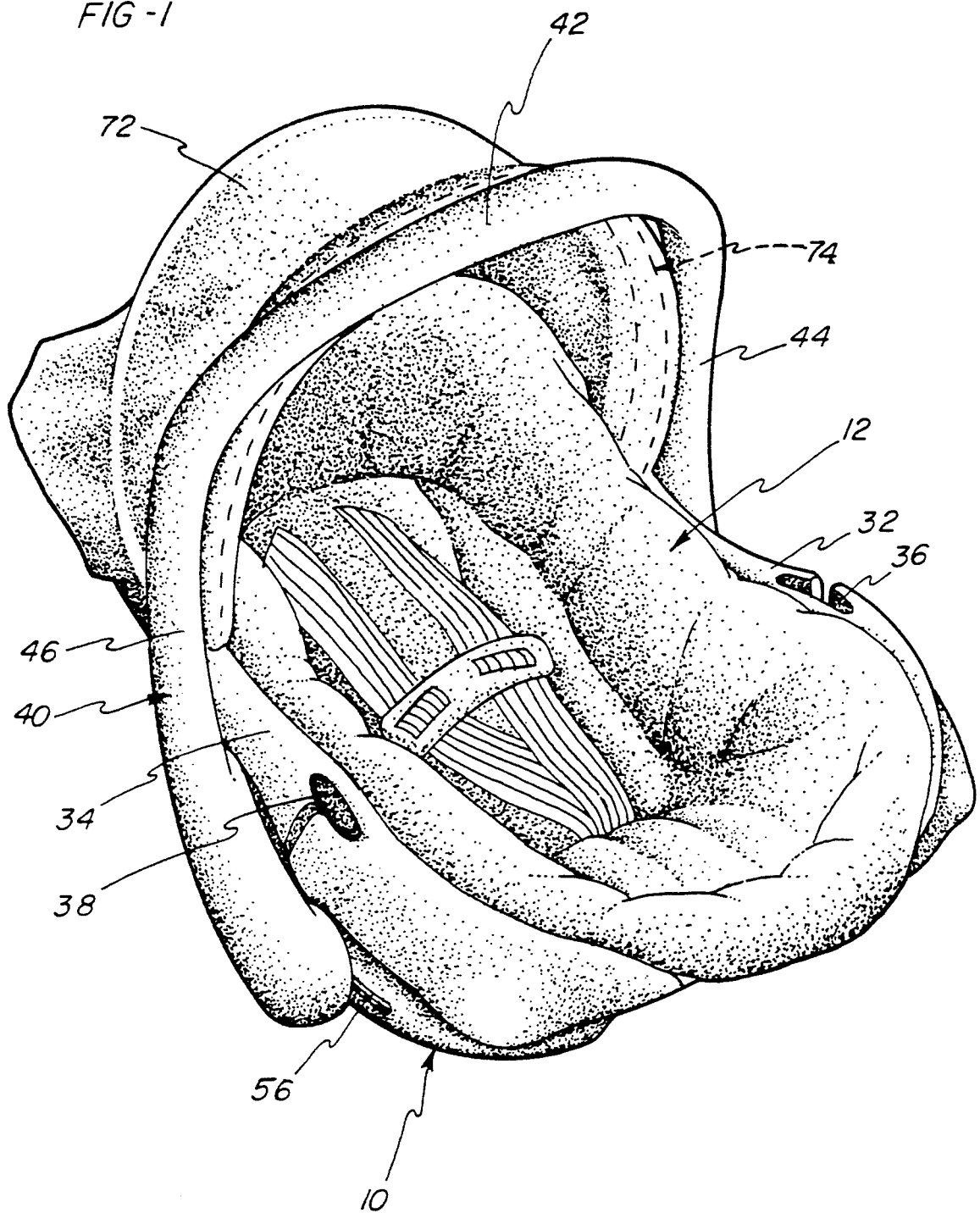
FIG. 1 is a perspective view of the infant carrier of the present invention.
Figure 2:
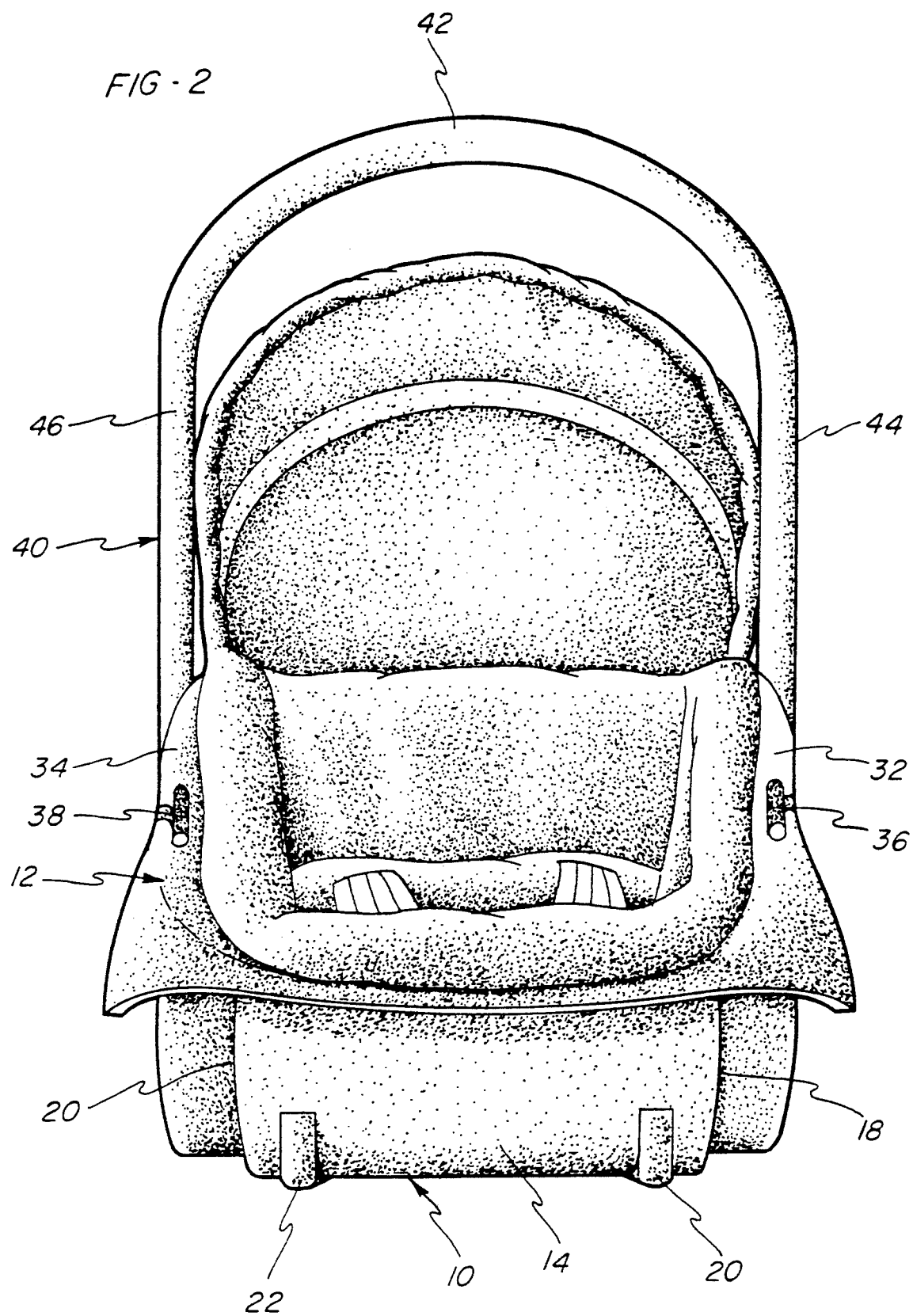
FIG. 2 is a front elevational view of the infant carrier.
Figure 3:
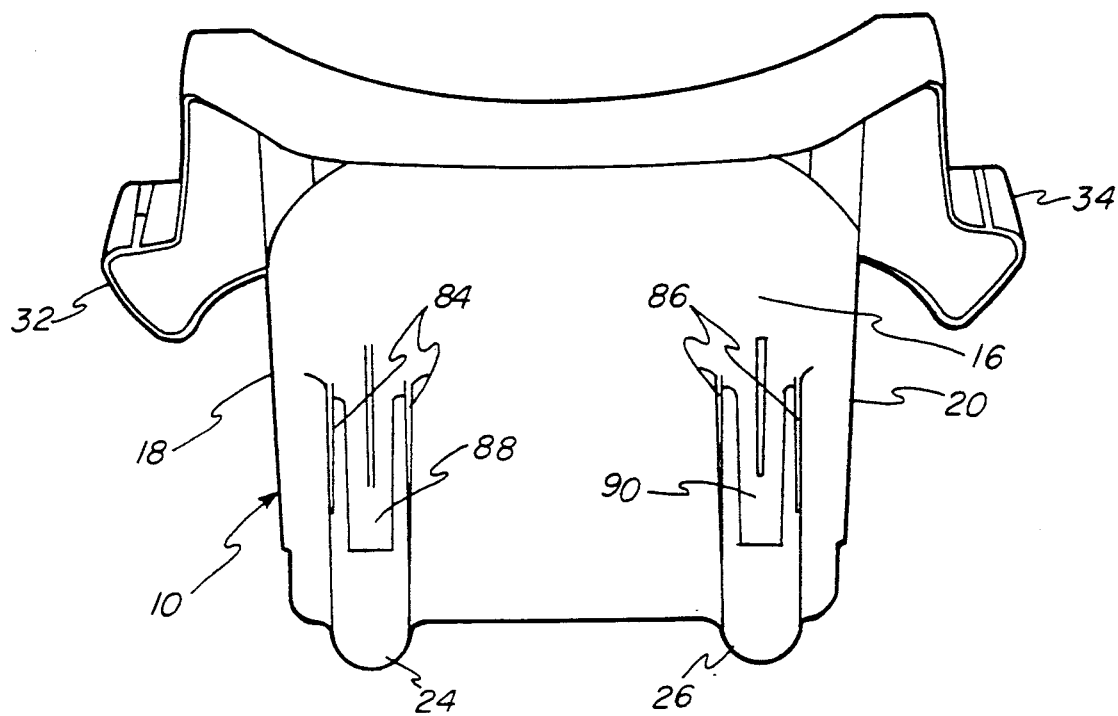
FIG. 3 is a rear elevational view of the shell portion of the infant carrier.
Figure 4:
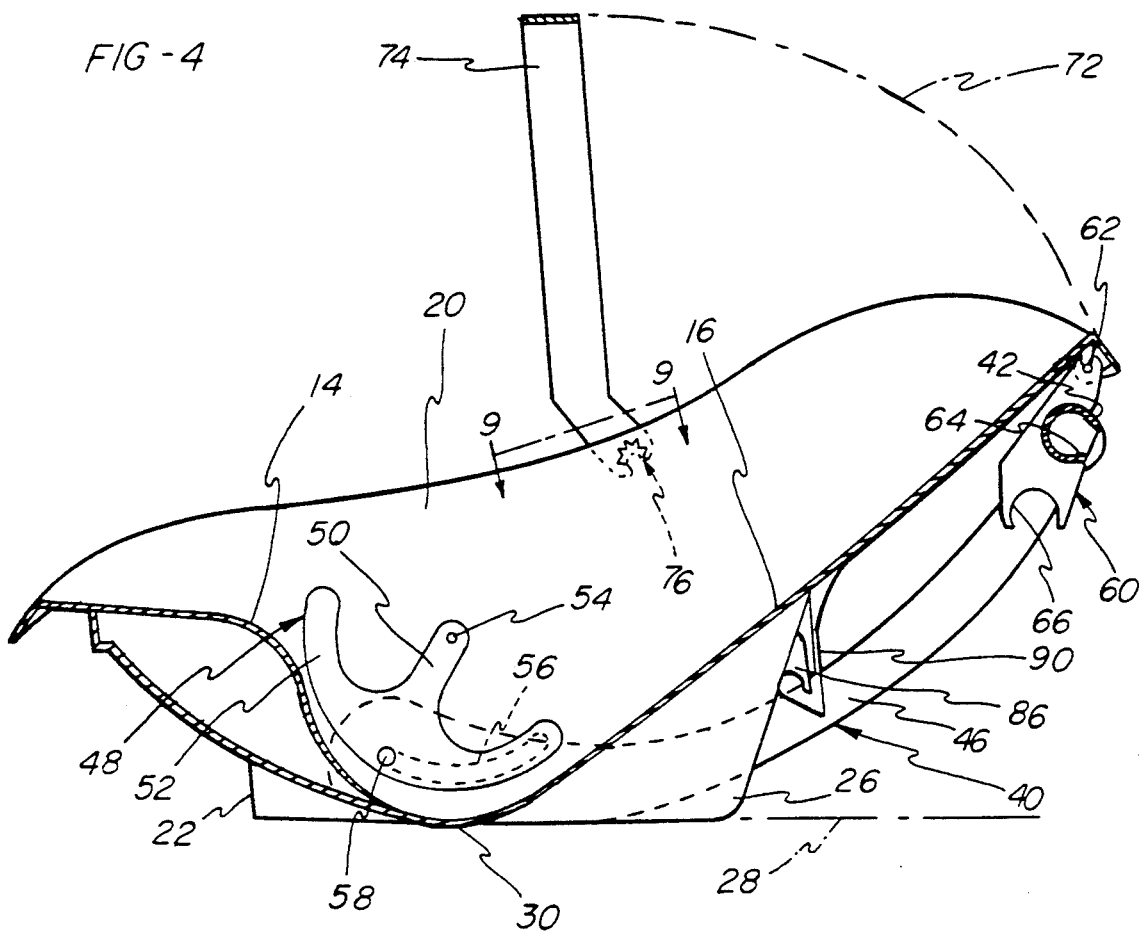
FIG. 4 is a side elevational view of the infant carrier taken along a cross-sectional line through the longitudinal center of the infant carrier wherein the handle is shown in a first rest position.

Referring to FIGS. 1–4, the infant seat of the present invention includes a shell 10 which is preferably formed of a molded plastic material, the inside of which may be lined with a conventional cushioning material 12. As is best seen in FIGS. 3 and 4, the shell 10 is defined by a seat portion 14, a back portion 16, and opposing first and second side walls 18, 20 extending along the seat portion 14 and the back portion 16 to form a cavity for receiving an infant. In addition, a pair of front truss members 20, 22 extend from a lower surface of the seat portion 14 and a pair of rear truss members 24, 26 extend from a lower surface of the back portion 16. The lower surface of the rear truss members 24, 26 form a base surface defining a base plane 28 for supporting the shell 10, and the lower surface of the front truss members 20, 22 are substantially coplanar with or slightly angled from the planar surface 28. It should be noted that the seat portion 14 and back portion 16 intersect at an arcuate apex point 30 and the base plane 28 extends tangent to the apex point 30.

The shell 10 is further provided with flange portions 32, 34 extending laterally outwardly from the sides 18, 20. The flange portions 32, 34 each include a T-shaped slot 36, 38 formed therein for receiving a seat belt whereby the infant seat may be securely attached to an automobile seat in a rearwardly facing orientation.

The infant seat is further provided with a U-shaped handle 40 (see also FIG. 7) having a curved lateral portion 42 and first and second leg portions 44, 46. The leg portions 44, 46 are formed as arcuate members including a curved back surface which forms a rocking surface for the infant seat, as will be described below.

The infant seat further includes first and second pivotal mounting means located on respective sides 18, 20 of the shell 10. The structure of the pivotal mounting means will be described with reference to the components of the mounting means located at the side wall 20, as illustrated in FIG. 4, and it should be understood that the other pivotal mounting means at the side 18 is formed with an identical structure.

The pivotal mounting means includes a link 48 having a pivot portion 50 and an arcuate cover portion 52. The pivot link 48 is mounted to the side wall 20 by means of a pin 54 extending through an aperture at an end of the pivot portion 50 as well as through an aperture in the side wall 20 whereby the pivot link 48 is pivotally mounted to the side wall 20. The cover portion 52 extends over and forms a cover for an arcuate slot 56 defined in the side wall 20 below the aperture for the pin 54, and a second pin 58 extends through a central portion of the cover portion 52 to engage an aperture formed in the leg 44 of the handle 40. Thus, the handle 40 is mounted for pivotal movement about an axis defined by the pin 58 and is additionally movable in a front to rear longitudinal direction along the slot 56. During the longitudinal movement of the handle 40 along the slot 56, the pivot link 50 pivots about the pivot point defined by the pin 54, and it should be noted that the arcuate cover portion 52 will extend over the slot 56 during any position of the handle to thereby ensure that an infant's fingers will not be pinched in the arcuate slot 56 as the link 48 is pivoted.

As may be seen in FIG. 4, a rocker support 60 is mounted to an upper longitudinal end of the back portion 16 on a side of the shell 10 opposite from the cavity for receiving an infant. The rocker support 60 is formed as an elongated element including pivot means 62 for pivotally mounting the rocker support 60 to the shell 10. The rocker support 60 further includes means defining a rearwardly facing slot 64 and a downwardly facing slot 66 wherein the slots 64, 66 are adapted to receive the lateral handle portion 42 therein and are constructed such that each slot will extend around the handle portion 42 an amount greater than 180° such that the handle portion 42 will be retained within the slots 64, 66.

The rocker support 60 is used for positioning the handle 40 for two of three modes of operation for the infant seat. In a first or rest position for the handle 40, as illustrated in FIG. 4, the pivot axis for the handle 40 defined by the pivot pin 58 is located adjacent to a forward end of the pivot slot 56. In addition, the lateral handle portion 42 is engaged in the rearwardly facing slot 64 of the rocker support 60 and the rocker support 60 is pivoted to a position close to the back portion 16. In this position, the handle 40 is positioned above the base plane 28 whereby the rear trusses 24, 26, as well as the front trusses 20, 22, may be used to support the shell 10 in a non-rocking or rest position. In this mode of operation, the infant seat may be used as a car seat in that a planar support surface is provided for supporting the infant seat in a stationary position on an automobile seat.

Figure 5:
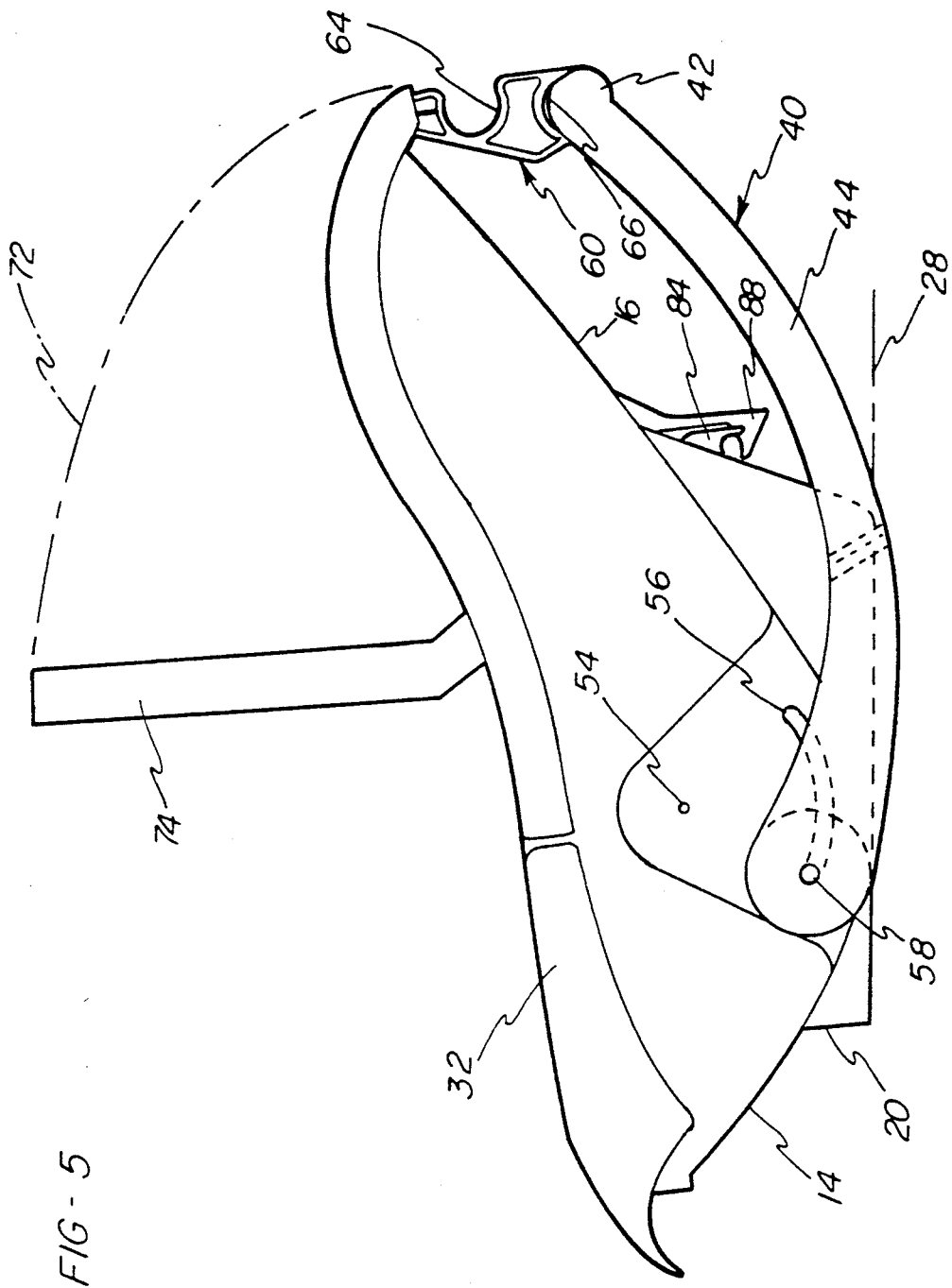
FIG. 5 is a side elevational view showing the handle in a second rocker position.
Figure 6:
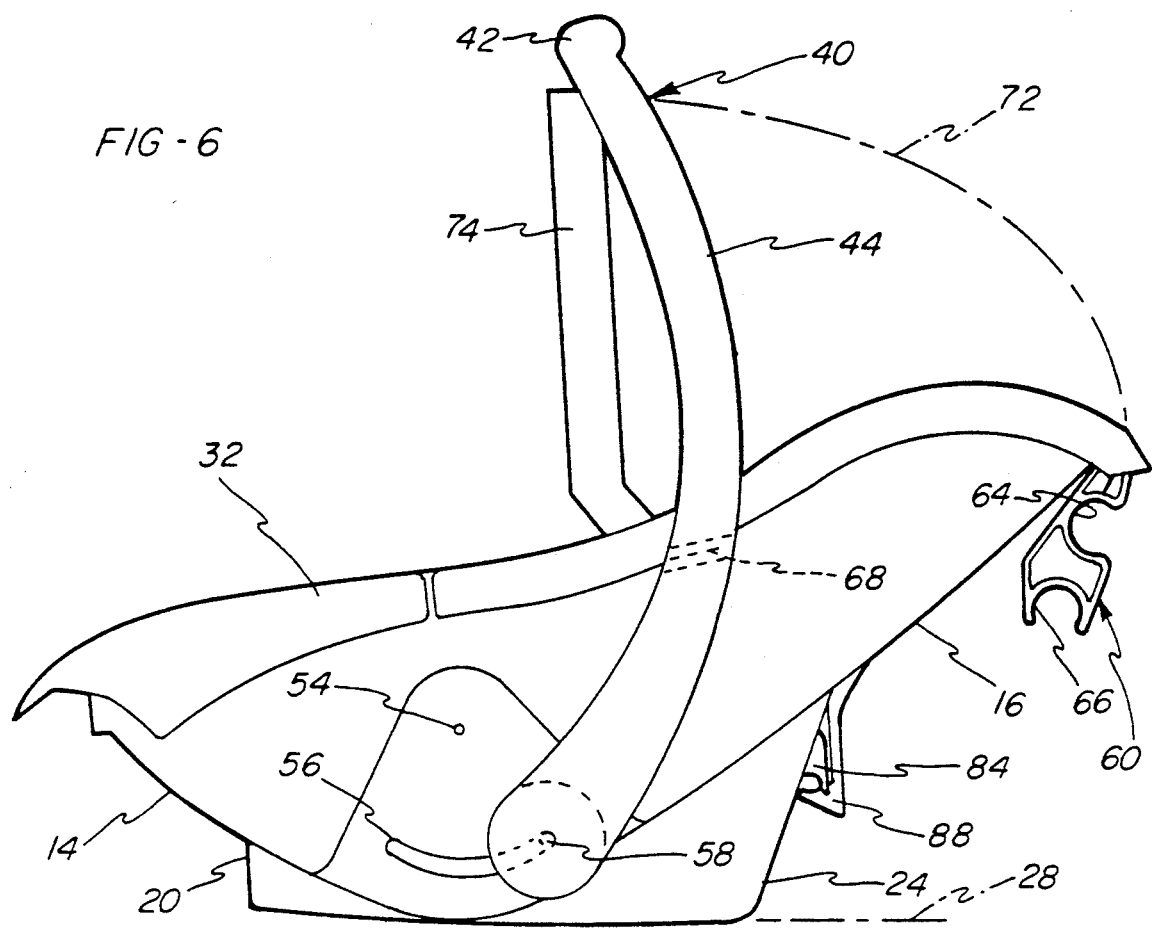
FIG. 6 is a side elevational view showing the handle in a third carry position.

In a second mode of operation for the infant seat, as illustrated in FIG. 5, the pivot axis for the handle 40 is again located adjacent to a forward end of the pivot slot 56 and the lateral portion 42 of the handle 40 is engaged with the downwardly facing slot 66 of the rocker support 60 with the rocker support 60 located in a position pivoted away from the back portion 16 of the shell 10. In this position of the handle 40, the arcuate leg portions 44, 46 extend below the base plane 28 and define an arcuate rocking support surface for the shell 10. In addition, the front truss members 20, 22 define limiting surfaces for limiting the forward rocking motion of the infant seat.

Figure 7:
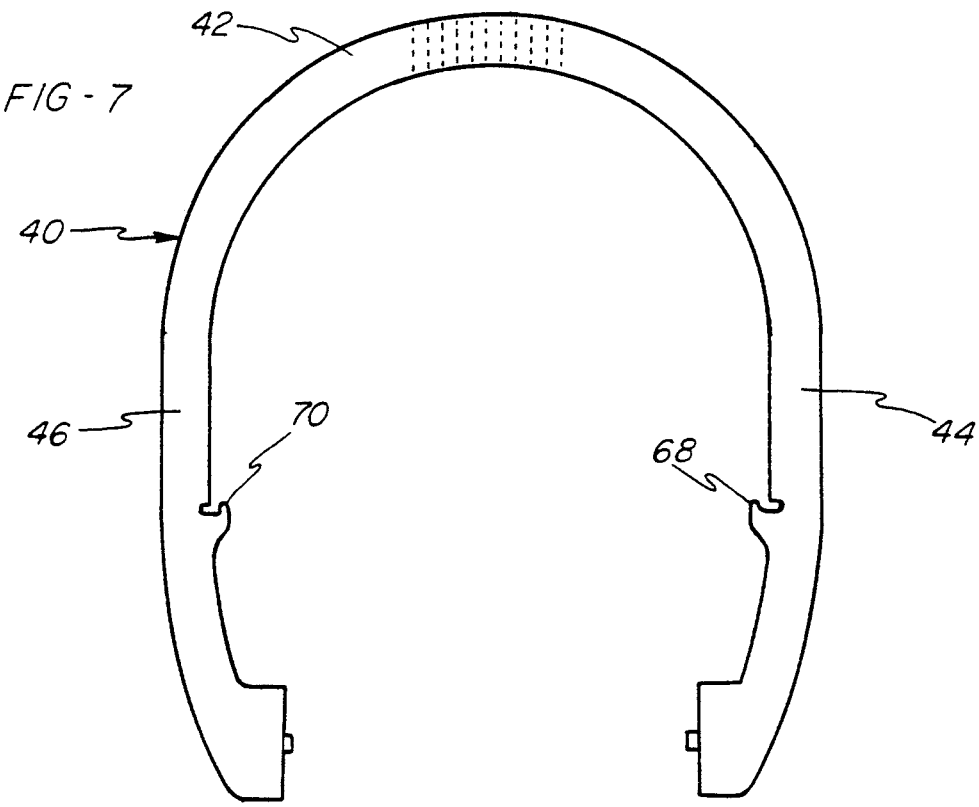
FIG. 7 is a front elevational view of the handle portion.

In a third mode of operation for the infant seat, the handle 40 is movable to a position wherein the lateral portion 42 is located above the cavity for receiving an infant and the pivot axis defined by the pin 58 is located adjacent to a rearward end of the pivot slot 56. Referring further to FIG. 7, each of the handle legs 44, 46 includes a pawl 68, 70 extending from a middle section of each of the legs 44, 46 between the lateral portion 42 and the pivot axis. The pawls 68, 70 extend laterally inwardly toward the shell 10 and upwardly toward the lateral portion 42. In the third position for the handle 40, the pawls 68, 70 engage the shell 10 underneath the laterally extending flange portions 32, 34 to limit the upward pivotal movement of the handle 40. In this position of the handle 40, the lateral portion 42 is preferably positioned such that a line passing through the lateral portion 42 and the pivot axis defined by the pin 58 passes through the center of gravity for the seat whereby the infant seat operates as a carrier properly balanced for carrying an infant.

Figure 8:
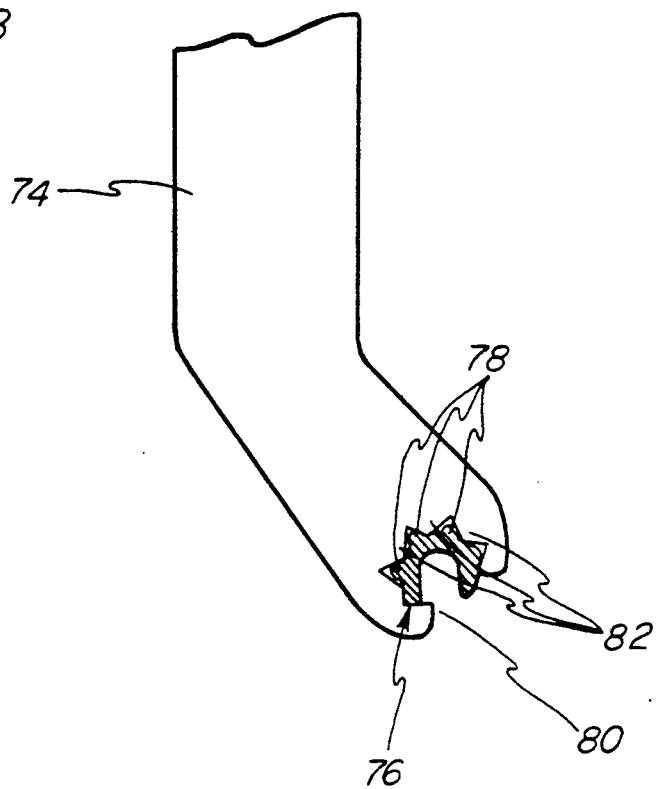
FIG. 8 is a detail view showing the connection between one end of the main canopy stay as it cooperates with a semi-cylindrical stub mounting point on the shell portion of the infant carrier.
Figure 9:
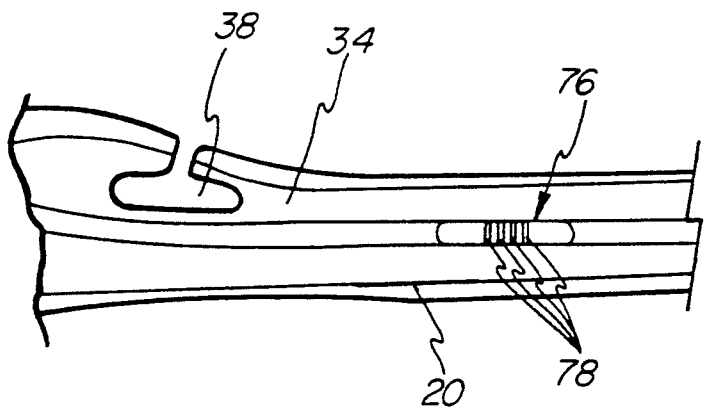
FIG. 9 is a top plan view of a section of the upper edge of the shell as viewed along line 9—9 in FIG. 4 and showing one of the mounting stubs.

Referring to FIGS. 4, 8 and 9, the infant seat is further provided with a canopy 72 which is supported by a main canopy stay 74 extending within a pleat or fold formed within the canopy 72, and a secondary canopy stay (not shown) may also be provided embedded within the canopy 72 for maintaining a preferred shape for the canopy 72. As may be best seen in FIGS. 8 and 9, the shell 10 is provided with semi-cylindrical mounting stubs 76 located adjacent to each of the lateral flange portions 32, 34 for mounting the main canopy stay 74. The mounting stubs 76 include a plurality of radially extending detents 78. The main stay 74 includes means defining a slot 80 at each end thereof for extending around the mounting stubs 76. In addition, the ends of the main stay 74 are each provided with a plurality of radially inwardly extending tangs 82 for cooperating with the detents 78 whereby the main stay 74 will be held in a stationary position relative to the shell 10. When it is desired to reposition the main stay 74 relative to the shell 10, the main stay 74 may be rotated around the mounting stub 76 causing the tangs 82 to rise over the detents 78 and pass to another position where the tangs 82 extend into locations between the detents 78.

Referring to FIGS. 3–6, downwardly extending hanger members 84, 86 are formed on the back portion 16 of the shell 10 extending adjacent to the rear truss members 24, 26, and form in combination with the rear truss portions 24, 26 a groove for receiving a bar for wire rail for a grocery cart whereby the infant seat may be supported between a pair of rails of a grocery cart seat. In addition, resilient clip members 88, 90 are located adjacent to the hanger members 84, 86 whereby the grocery cart rail will be retained in the groove between the truss members 24, 26 and the hanger members 84, 86.

By providing the present construction for an infant seat, a simple mechanism is provided for enabling the infant seat to be used as a car seat, a rocker and an infant carrier, as well as permitting the infant seat to be used in conjunction with a grocery cart. By providing lateral movement for the handle of the present infant seat, the relative position between the handle pivot axis and the center of gravity of the infant seat may be altered whereby the most advantageous relative position between the handle connection and the center of gravity may be obtained for the particular mode of operation. For example, for the rocking operation it is desirable to have the center of gravity located rearwardly of the pivot portion of the handle forming the front of the rocker surface, and for the infant carrying mode of operation it is desirable to have the pivot point for the handle located along a line through the lateral handle portion and the center of gravity for the seat.

Further, the present invention provides a convenient and simple mechanism for providing for adjustment of the canopy position wherein the main canopy stay may be rotated to and positively maintained in a plurality of predetermined positions.

While the form of apparatus herein describes a preferred embodiment of the invention, it is to be understood that the invention is noted limited to this precise form of apparatus, and that changes may be made therein without departing from the scope of the invention which is defined in the appended claims.

What is claimed is:

1. An infant seat comprising:
   a shell defining a cavity for receiving an infant;
   an arcuate handle attached to opposing sides of said shell;
   said handle being movable to three operative positions including:
   (a) a rest position wherein said handle is positioned below said shell and above a plane defined by a lower surface of said shell;
   (b) a rocking position wherein said handle is positioned below said lower surface of said shell to form an arcuate rocking support surface; and
   (c) a carry position wherein said handle is positioned above said shell to be used as a carry handle.

2. The infant seat of claim 1 including pivotal mounting means for mounting said handle for pivotal movement about an axis passing through said handle and means for guiding said pivotal mounting means for movement in a front to rear longitudinal direction along said shell.

3. The infant seat of claim 2 wherein said means for guiding defines an arcuate path for guiding said movement of said pivotal mounting means in said longitudinal direction.

4. The infant seat of claim 3 wherein said means for guiding comprises means defining apertures in said opposing sides of said shell and arcuate slots curved concavely toward said apertures, a link member pivotally mounted to said shell at each said aperture and extending to a location adjacent to a respective said arcuate slot, said handle being pivotally mounted to each said link member at said location adjacent to said arcuate slot.

5. The infant seat of claim 1 including a rocker support located on said shell for engaging said handle in said rest position and said rocking position.

6. The infant seat of claim 5 wherein said rocker support includes means defining first and second cooperating portions for engaging and holding said handle in said rest and rocking positions, respectively.

7. The infant seat of claim 6 wherein said cooperating portions include means defining slots for receiving said handle and said rocker support is pivotally mounted to said shell for locating said handle in said rest and rocking positions.

8. The infant seat of claim 1 wherein said handle includes first and second legs extending along said opposing sides of said shell, each said leg including a pawl member for engaging a flange portion extending laterally outwardly from an upper edge of said shell when said handle is in said carry position.

9. The infant seat of claim 1 including a canopy stay extending over said cavity and having opposing stay ends mounted to said opposing sides of said shell, said canopy stay being mounted for pivotal movement about said stay ends to a plurality of positions.

10. The infant seat of claim 9 including first and second semi-cylindrical stubs located adjacent to said opposing sides of said shell, each said stub including a plurality of radially extending detents, said stay ends each including means defining a slot having a plurality of radially extending tangs for cooperating with said detents to define said plurality of positions for said stay.

11. The infant seat of claim 1 including a flange portion extending laterally outwardly from said shell and means defining slots in said flange portion for receiving and retaining an automobile seat belt in contact with said infant seat.

12. The infant seat of claim 1 including means defining a downwardly facing groove on a side of said shell opposite from said cavity, said groove being adapted to receive a wire rail for a grocery cart.

13. An infant seat comprising:
    a shell defined by a seat portion, a back portion, opposing first and second side walls extending along said seat portion and said back portion to form a cavity for receiving an infant, and means defining a planar base portion to form a support for said shell;
    a U-shaped handle including a lateral portion and opposing first and second leg portions extending from said lateral portion;
    first and second handle pivot pins engaging said first and second leg portions, respectively, to define a pivot axis for said handle, said pivot axis intersecting said first and second side walls; and
    means supporting said handle pivot pins for movement whereby said pivot axis is movable to different positions on said side walls.

14. The infant seat of claim 13 including means defining positioning slots in said first and said second side walls, said handle pivot pins extending through and being supported for movement along said positioning slots.

15. The infant seat of claim 13 wherein said means supporting said handle pivot pins include first and second links mounted to pivot points on said first and second side walls, respectively, such that said pivot axis is movable along an arcuate path about a center of curvature defined by said pivot points.

16. The infant seat of claim 13 wherein said first and second leg portions each include a pawl member for engaging a flange portion extending laterally outwardly from said shell when said handle is pivoted to a position above said shell for carrying said infant seat.

17. An infant seat comprising:
    a shell defined by a seat portion, a back portion, opposing first and second side walls extending along said seat portion and said back portion to form a cavity for receiving an infant, and means forming a base surface on a side of said shell opposite from said cavity to define a base plane for supporting said shell;

a U-shaped handle including a lateral portion and opposing first and second arcuate leg portions extending from opposing ends of said lateral portion and extending along said first and second side walls, respectively;

first and second pawls extending from middle sections of said first and second leg portions, respectively, said pawls extending toward said lateral portion of said handle in spaced relation to respective leg portions;

means defining a first pivot aperture in said first side wall and a second pivot aperture in said second side wall;

means defining a first arcuate pivot slot in said first side wall and a second arcuate pivot slot in said second side wall, said first pivot slot having a center of curvature at said first pivot aperture and second pivot slot having a center of curvature at said second pivot aperture;

a first link including a first link pivot pin extending through said first pivot aperture for pivotally mounting said link to said first side wall, said first link further including a pivot portion extending toward said first pivot slot and an arcuate portion for covering said first pivot slot interior of said shell;

a second link including a second link pivot pin extending through said second pivot aperture for pivotally mounting said link to said second side wall, said second link further including a pivot portion extending toward said second pivot slot and an arcuate portion for covering said second pivot slot interior of said shell;

a first handle pivot pin extending through said first pivot slot and pivotally connecting said first leg portion of said handle to said first link;

a second handle pivot pin extending through said second pivot slot and pivotally connecting said second leg portion of said handle to said second link;

a rocker support pivotally connected to said shell on a side of said back portion opposite from said cavity and at a longitudinal end of said back portion distal from said seat portion, said rocker support including means defining a rearwardly facing slot and a downwardly facing slot;

said handle being movable to a first position to engage said lateral portion within said rearwardly facing slot of said rocker support with said rocker support located in a position adjacent to said shell and said handle pivot pins located adjacent to a forward end of said pivot slots whereby said handle is positioned above said base plane and said support surface is positioned for supporting said shell;

said handle being movable to a second position to engage said lateral portion within said downwardly facing slot of said rocker support with said rocker support located in a position pivoted away from said shell and said handle pivot pins located adjacent to said forward end of said pivot slots whereby said leg portions of said handle extend below said base plane and said leg portions define an arcuate rocking support for said shell; and said handle being movable to a third position with said lateral portion located above said cavity and said pawls engaged under flanges formed at an upper edge of said shell with said handle pivot pins located adjacent to a rearward end of said pivot slots whereby said handle is positioned for carrying said infant seat.

18. The infant seat of claim 17 including a canopy stay extending over said cavity and having opposing stay ends mounted to said first and second side walls, said canopy stay being mounted for pivotal movement about said stay ends to a plurality of positions.

19. The infant seat of claim 18 including first and second semi-cylindrical mounting stubs located adjacent to said flanges, each said stub including a plurality of radially extending detents, said stay ends each including means defining a slot having a plurality of radially extending tangs for cooperating with said detents to define said plurality of positions for said stay.

20. The infant seat of claim 17 including means defining slots in said flanges for receiving and retaining an automobile seat belt in contact with said infant seat.

21. The infant seat of claim 17 including means defining a groove on said side of said shell opposite from said cavity and extending in a lateral direction between said first and second sides, said groove being adapted to receive a wire rail for a grocery cart, and a resilient clip member for retaining the wire rail within said groove.

* * * * *